March 9, 1926. 1,576,215
A. PERIS
APPARATUS FOR USE IN IMPARTING FLAVOR TO PEANUTS
Filed Oct. 31, 1924
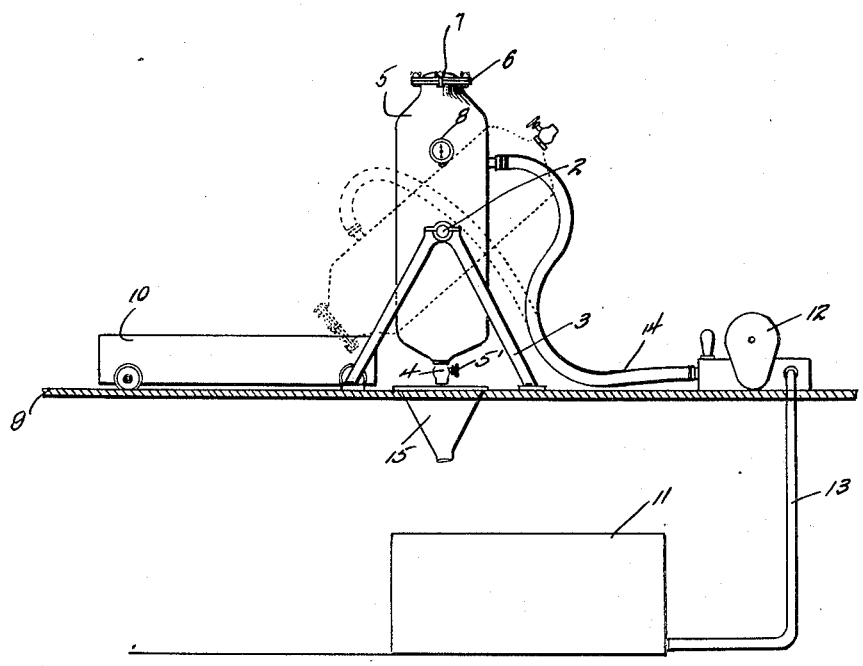
Adolphus Peris
Inventor
By
Attorney Patented Mar. 9, 1926.

1,576,215

UNITED STATES PATENT OFFICE.

ADOLPHUS PERIS, OF FLORIN, PENNSYLVANIA.

APPARATUS FOR USE IN IMPARTING FLAVOR TO PEANUTS.

Application filed October 31, 1924. Serial No. 747,013.

*To all whom it may concern:*

Be it known that I, ADOLPHUS PERIS, a citizen of the United States, residing at Florin, in the county of Lancaster and State of Pennsylvania, have invented certain new and useful Improvements in Apparatus for Use in Imparting Flavor to Peanuts, of which the following is a specification.

This invention relates generally to confectionery machines and has more particular reference to an apparatus for facilitating salting or otherwise flavoring peanuts and the like.

The primary object of the invention is to provide an apparatus of the above character that is relatively simple in construction and one that may be used for the purposes intended in a simple and inexpensive manner.

With the foregoing and other objects in view, as the nature of the invention will be better understood, the same comprises the novel form, combination and arrangement of parts hereinafter more fully described, shown in the accompanying drawing and claimed.

In the drawing, the figure is a side elevation of the apparatus constituting the preferred embodiment of my invention.

With specific reference to the drawing, the apparatus comprises a tiltable tank 5, preferably of steel, pivotally maintained at 2 on an appropriate support 3, the latter being preferably, though not necessarily formed by fixed standards in parallelism. At one end, the said tank is provided with a contracted discharge spout 4, valved as designated by 5'. The opposite end of the tank is provided with a flanged mouth 6, and in connection with said mouth an appropriate closure is employed, the closure illustrated including a cap 7, secured to the tank, by bolt and nut connections, as shown. By preference, the tank 5 is provided with a pressure gage 8, designed to enable an operator to readily ascertain the pressure used in the tank.

The supporting standard for said tank is disposed upon a table or platform 9, and movable thereon, at one side of the tank is a receptacle 10, for the reception of flavored peanuts from the tank 5. A storage tank 11 for brine or any other flavoring that is employed is disposed directly beneath the table or platform, and at a point in vertical alignment with said tank. A pressure pump 12 is connected, by an appropriate conduit 13, with the tank 11, and connected, through the medium of a flexible conduit or hose 14, with the tank 5.

Below the center of movement of the tank 5 and also below the arc of movement of the said tank is a hopper 15 designed to receive brine from the tank and discharge the same into the storage tank 11.

In the practical use of my novel apparatus, the tank 5 is charged with peanuts and the pump 12 is actuated for the supply of brine or a solution of sodium chloride under pressure to the tank. When the pressure in the tank reaches about thirty pounds the pump 12 is stopped. Then, while the tank 5 is in an upright position, the valve 5' is opened and the brine is discharged from the tank into the storage tank 11 for further use in the manner described. After this operation, the cap 7 is removed from the tank and the tank is tilted, as illustrated by dotted lines, for the quick and convenient discharge of the flavored peanuts into the receptacle 10.

It will be apparent from the foregoing that in accordance with my invention, the peanuts are quickly and thoroughly flavored, the maintenance of pressure in the presence of the peanuts and the flavoring solution being an important factor in the flavoring of the peanuts.

I have specifically described the apparatus constituting the preferred embodiment of my invention, in order to impart an exact understanding of said embodiment, though it is to be understood that my invention is defined by my appended claim, within the scope of which changes or modifications may be made without departure from my invention.

Having thus described my invention, what I claim as new and desire to secure by Letters Patent is:

An apparatus for imparting flavor to peanuts comprising a platform, a standard rising from the platform, a tank rockably mounted on the upper end of the standard, a valved spout at one end of the tank, a closure at the other end of the tank which may be removed for filling the tank with peanuts, a pump mounted on the platform, a flexible tube connecting the pump with the tank, a hopper depending from the platform, a storage tank below the hopper, and a pipe connecting the pump with the storage tank.

In testimony whereof I affix my signature.

ADOLPHUS PERIS.